April 5, 1932.  W. H. STEAD  1,852,222
HEADLIGHT
Filed Nov. 29, 1929  2 Sheets-Sheet 1
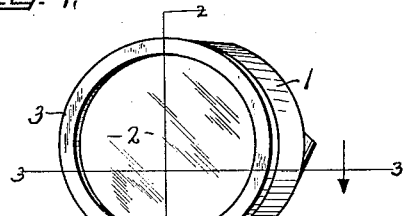
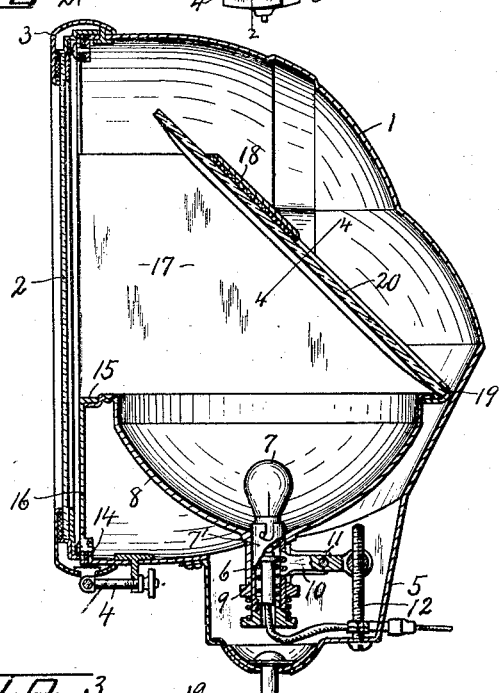
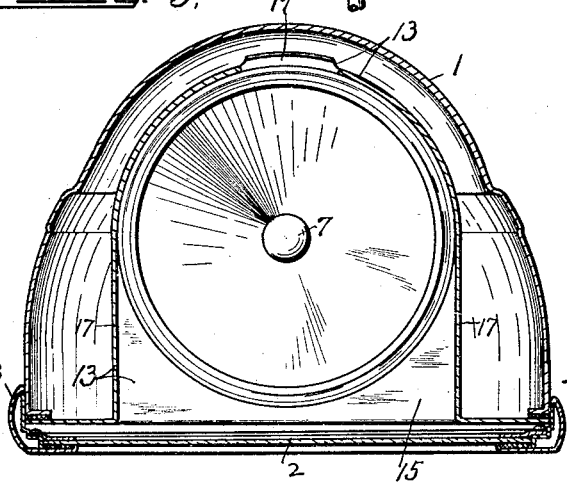
INVENTOR
W. H. Stead

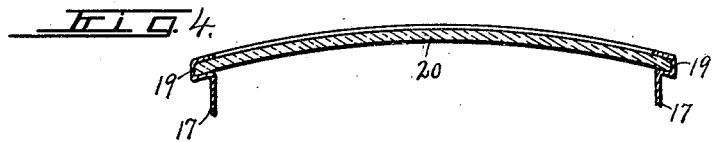
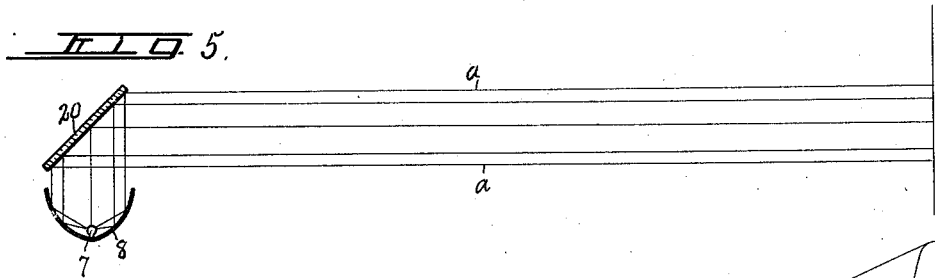
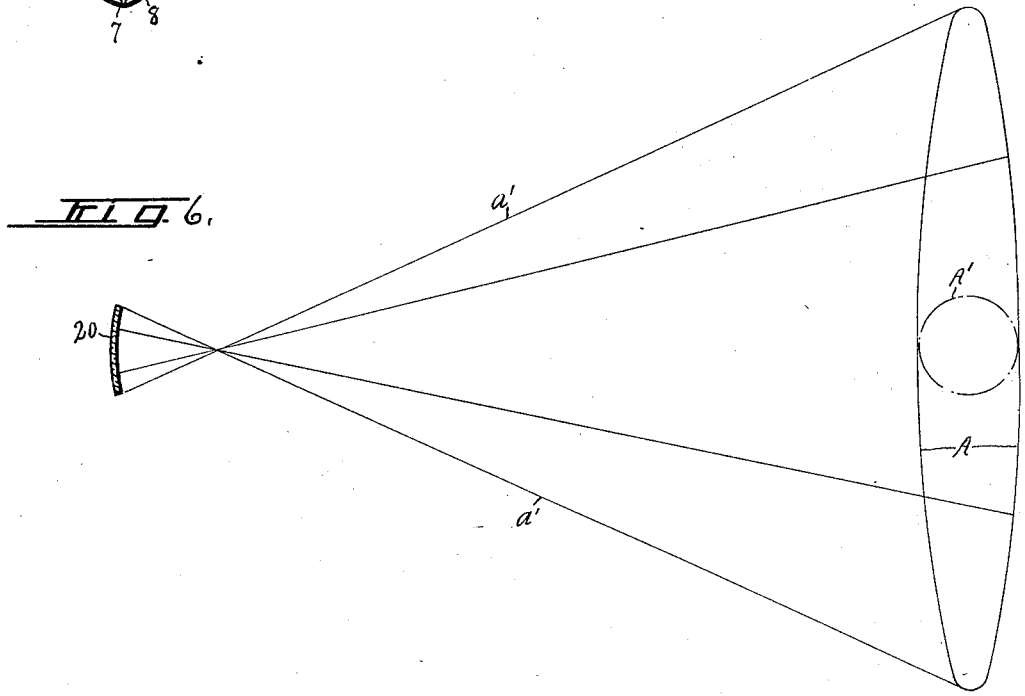

Patented Apr. 5, 1932

1,852,222

UNITED STATES PATENT OFFICE

WILLIAM H. STEAD, OF BINGHAMTON, NEW YORK

HEADLIGHT

Application filed November 29, 1929. Serial No. 410,572.

This invention relates to a headlight for automobiles and other motor vehicles and involves the use of a hollow casing and a source of light located in the lower portion of the casing, means for reflecting the light from said source upwardly within the casing and additional means for again reflecting the reflected light forwardly through a transparent or translucent plate or lens in the open front side of the casing.

The main object is to provide simple and efficient means for projecting a beam of light forwardly a long distance and across a wide field and at the same time to keep the beam of light below the level of the eyes of pedestrians and the drivers of approaching vehicles without sacrificing the intensity of the light and thereby to greatly reduce the liability of accidents.

One of the specific objects is to produce a field of light of high intensity which is of considerably greater horizontal width than vertical height for the purpose of illuminating the roadbed and adjoining fields a considerable distance ahead of the vehicle.

Other objects and uses relating to specific parts of the lamp will be brought out in the following description.

In the drawings:

Figure 1 is a perspective view of a headlight embodying the various features of my invention.

Figure 2 is an enlarged longitudinal vertical sectional view taken in the plane of line 2—2, Figure 1.

Figure 3 is an enlarged horizontal sectional view taken in the plane of line 3—3, Figure 1.

Figure 4 is a transverse sectional view through the forwardly projecting reflector taken in the plane of line 4—4, Figure 2.

Figure 5 is a vertical sectional view on a reduced scale through the central portion of both reflectors showing the source of light and the vertical height of the forwardly projecting beam of light.

Figure 6 is a sectional view on a reduced scale of the forwardly projecting reflector showing the laterally projecting rays of light and the form of the distant field of light.

As illustrated, this lamp comprises a hollow casing —1— which is mainly circular in front face view and provided with an opening in its front end in which is placed a transparent or translucent closure —2— of glass or other suitable material held in place by a retaining ring or bezel —3—, the latter, with the plate or lens —2— thereon, being removable and normally held in place by one or more clamping bolts —4—, as shown in Figure 2.

The case is preferably concavo-convex in cross section and is provided on its underside with a hollow pendant extension —5— for receiving a supporting member —6— for an incandescent electric lamp —7— and a reflector —8—.

The lamp —7— is detachably mounted in a socket —7'— by means of a bayonet-lock joint and is spring pressed outwardly by a coil spring —9—, the socket —7'— with the lamp —7— therein being mounted on the inner end of a lever —10— which is pivoted at —11— to the support —6— and is adapted to be adjusted about the axis of its pivot by means of an adjusting screw —12— to vary the position of the lamp —7— relatively to the focal point of the reflector —8— as may be required for reflecting rays of light parallel with or at an angle to the axis of the reflector the inner end of the lever having a toothed segment engaging a toothed rack on the lamp socket —7'— for transmitting motion thereto, as shown in Figure 2.

The reflector —8— is preferably of the parabolic type and is arranged in the bottom of the lower half of the case —1— with its axis vertical and at right angles to the horizontal axis of the casing.

The upper end of the reflector is open to allow the rays of light to be reflected upwardly parallel to the axis and is disposed in a horizontal plane some distance above the bottom but below the axis of the case —1—, as shown more clearly in Figure 2.

The case —1—, rim —3— and reflector —8— are preferably made of sheet metal, the inner surface of the reflector —8— being highly polished or otherwise treated for reflective purposes.

A reflector-supporting frame —13— is removably secured to and within the case —1— by bolts —14—, Figure 2, and is provided with a horizontal shelf —15— having a circular opening therein for receiving the upper end of the reflector —8— which is provided with an outturn annular flange bolted or otherwise removably secured to the shelf —15— around the opening so as to support the upper end of the reflector in substantially the same horizontal plane as the shelf, while its remaining portions project downwardly into the lower portion of the case —1— directly over the upper open end of the extension —5—.

The front edge of the horizontal shelf —15— is provided with a pendant flange or wall —16— having its lower edge secured by the bolts —14— to the front end of the case —1—, said shelf being also provided with opposite upright walls —17— extending upwardly from the shelf some distance above the horizontal axis of the case —1—.

The lower edges of these side walls are disposed in an inclined plane at an angle of approximately 45 degrees to the shelf —15— and also to the axis of the reflector —8— so as to incline upwardly and forwardly from the rear edge of said shelf, as shown in Figure 2.

The lower rear portions of the side walls —17— extend around the corresponding portions of the upper end of the reflector —8— while the upper portions of the rear edges of said partitions are united by a connecting plate —18— which, together with the remaining portions of the frame —13—, are preferably formed of sheet metal.

The rear edges of the sides —17— and shelf —15— are formed with groves —19— for receiving the opposite edges of a reflector —20—, as shown in Figures 2 and 4, the side grooves —19— being open at the top to allow the reflector —20— to be removed and replaced therethrough.

The major portions of the lower and upper edges of the reflector —20— are circular and of about the same radius as that of the lower reflector —8— but the opposite side edges of said reflector —20— are preferably straight and parallel and also the corresponding portions of the walls of the grooves —19— are straight and parallel to facilitate the insertion and removal of the reflector and also to hold the latter against circumferential movement when adjusted for use.

This reflector —20—, and particularly its front reflecting surface, is concave transversely but straight vertically, the radius of transverse curvature of said surface being sufficiently long to cause its reflected rays to focus or intersect in front of the lens and then to diverge laterally equally to opposite sides of the horizontal axis of the case —1—, as shown more clearly in Figure 6.

Two distinct sets of light rays, as —a— and —a'—, will be projected forwardly by the reflector —20—, one set by the straight lines of the reflecting surface and the other set by the transversely curved portions of said surface. That is, the rays transmitted by the straight surfaces will be projected forwardly along parallel lines and will form a relatively narrow vertical beam of light, while those projected by the concave surface will be laterally divergent beyond the focal point and within the vertical width of the beam produced by the straight surface.

In other words, the illuminated field upon which the light is projected will be relatively narrow vertically but of considerable width horizontally which increases proportionately to its distance from the source of light, as illustrated more clearly in Figure 6.

It will be observed that the rays of light passing from the reflector —8— to the reflector —20— in parallel lines are in more or less of a circular beam A' and that the two sets of rays reflected forwardly by the mirror —21— will be of full intensity and will illuminate the field at a longer distance ahead of the vehicle with a corresponding degree of intensity but in the form of a more or less horizontally elongated or elliptical form A, as shown in Figure 6, below the level of the eyes of approaching pedestrians and drivers of other vehicles, thereby greatly reducing the danger factor of driving.

It will also be observed upon reference to Figure 2, that the reflector —20— is oblique to the axis of the reflector —8— and extends over the entire area of the open upper end of the reflector —8— which, by reason of its parabolic form, projects a substantially cylindrical beam of light onto the reflecting surface of the reflector —20— which in turn converts the cylindrical beam into a more or less flat elliptical beam as it appears in the field some distance ahead of the vehicle with the major axis extending horizontally and the shorter axis vertically.

A similar effect is produced by the forward reflection of the direct rays of light from the lamp —7— thereby producing an intensely luminous core for the main elliptical beam which, in addition to the forwardly divergent reflected rays, produces a highly illuminated field covering the entire width of the roadway and adjoining topography a considerable distance ahead of the vehicle but sufficiently narrow and low vertically to avoid glare in the eyes of approaching pedestrians and drivers of other vehicles.

What I claim is:—

In a headlight of the character described, an outer case, a reflector supporting frame within the case comprising a horizontal shelf having a circular opening therethrough, said shelf having its rear half semi-circular and concentric with said opening and the opposite sides of its front half tangential to adjacent portions of the rear half, upright walls rising from said shelf and extending forwardly from the rear portion thereof around opposite sides of the opening, said upright walls having their rear portions concentric with the opening and their front portions disposed in parallel planes a distance apart slightly greater than the diameter of said opening, the rear edges of said walls and shelf being provided with grooves, an upwardly facing reflector seated in said opening, a source of light in said reflector, and a forwardly facing reflector extending upwardly and forwardly from the rear edge of the shelf across and beyond the axis of the first-named reflector and supported in said grooves.

In witness whereof I have hereunto set my hand this 11th day of November, 1929.

WILLIAM H. STEAD.